UNITED STATES PATENT OFFICE.

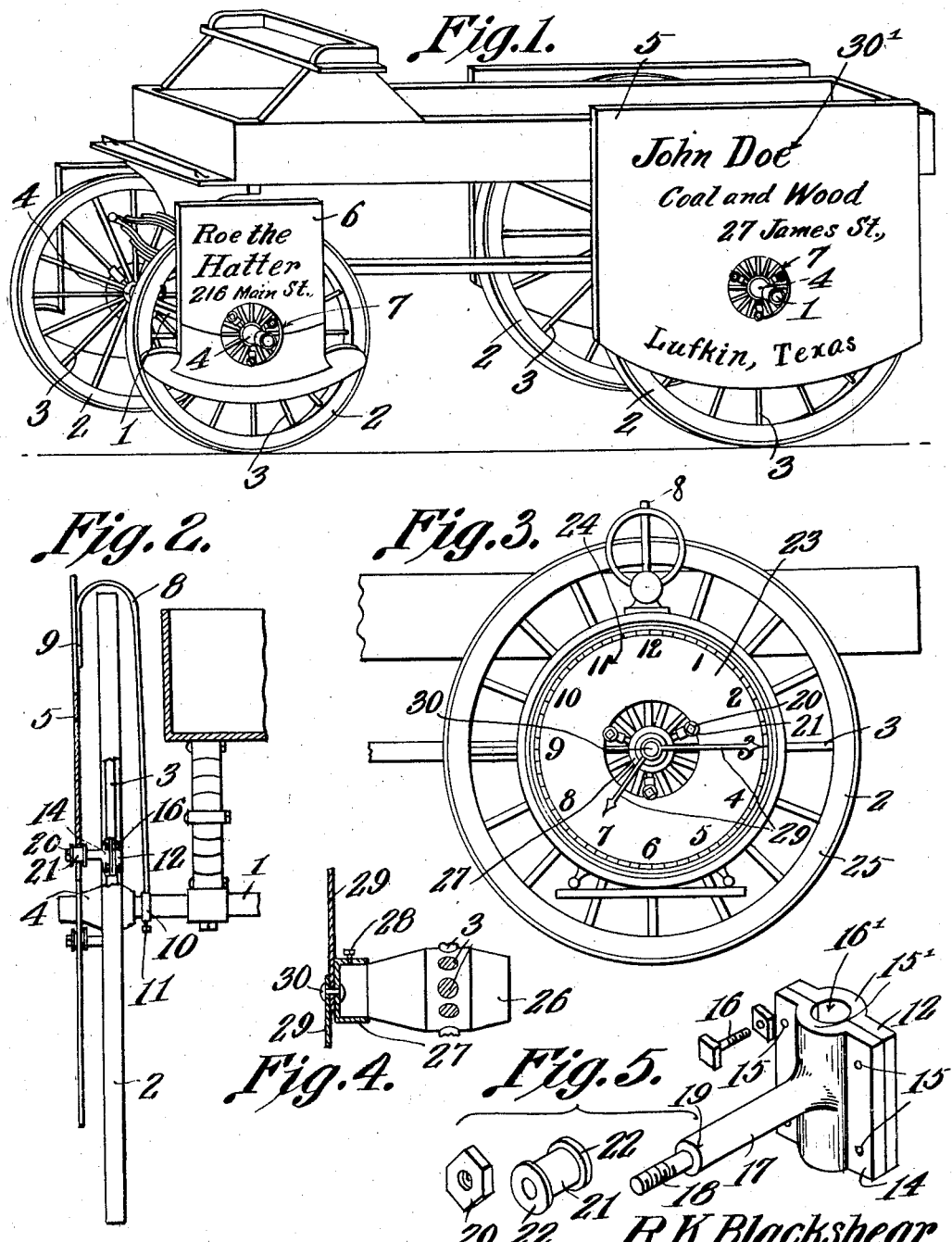

ROBERT KING BLACKSHEAR, OF LUFKIN, TEXAS.

ADVERTISING-SHIELD FOR VEHICLE-WHEELS.

1,054,819. Specification of Letters Patent. Patented Mar. 4, 1913.

Application filed January 4, 1912. Serial No. 669,348.

*To all whom it may concern:*

Be it known that I, ROBERT K. BLACKSHEAR, a citizen of the United States, residing at Lufkin, in the county of Angelina and State of Texas, have invented a new and useful Advertising-Shield for Vehicle-Wheels, of which the following is a specification.

The device forming the subject-matter of this application, is a shield, adapted to cover a portion of the wheel of a vehicle, the shield being adapted to receive advertising matter.

The invention aims to provide novel means for yieldingly supporting the shield, and to provide anti-friction elements, adjustable upon the spokes of the wheel of a vehicle, longitudinally of the spokes, from one end of each spoke to the other, which anti-friction elements are adapted to engage the periphery of an opening in the shield, to constitute a means for supporting the shield vertically.

A further object of the invention is to provide novel means for yieldingly supporting the shield from the axle of a vehicle, whereby the shield may be applied to the front axle, which has relative movement with respect to the vehicle body.

A further object of the invention is to provide a device of this type, in the form of a time piece dial, and to provide wheel-carried hands adapted to register upon the dial; novel means being provided for connecting the hands with the wheel.

A further object of the invention is to provide novel means for upholding, upon a single spoke of a vehicle wheel, an anti-friction element, by which the shield is vertically upheld.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings,—Figure 1 shows in perspective, a vehicle equipped with the device of the present invention; Fig. 2 is a sectional elevation of the device; Fig. 3 is an elevation showing a modified form of the invention; Fig. 4 is a section showing the means whereby the hands, employed in Fig. 3, are attached to the hub; and Fig. 5 is a perspective of the spoke-engaging clamp whereby the anti-friction element, engaging the shield, is supported.

In the accompanying drawings, the numeral 1 denotes the axle of a vehicle, the numeral 2 denoting the wheel, and the numeral 3 denoting the spokes of the wheel. The numeral 4 denotes the hub of the wheel.

The invention further includes a shield or body, which, as denoted by the numerals 5 and 6 in Fig. 1, may be of various forms. The shield is equipped with a circular opening 7, adapted to receive the hub 4. In order to support the shield or body 5 against movement transversely of the wheel 2, an arched spring 8 is provided, one end 9 of which is secured to the rear face of the body 5, the description being applied specifically to the body 5, although applicable with equal propriety to the body 6. The arched spring 8 extends over the vehicle wheel 2, as clearly shown in Fig. 2, and the lower end of the spring 8 is equipped with a member 10, of any desired form, and adapted to engage the vehicle axle 1. The member 10, if desired, may take the form of a ring, and be held in place upon the axle 1, removably, by means of a set screw 11. A clamp is provided, adapted to engage a single spoke 3 of the wheel 2, for adjustment upon the spoke 3, throughout the entire length of the spoke. This clamp may, as shown in Fig. 5, consist of separable parts 12 and 14, having openings 15, adapted to receive bolt and nut connections 16, whereby the parts 12 and 14 may be clamped upon a single spoke 3 of the wheel 2. The parts 12 and 14 are equipped with outstanding ribs 15', having mating grooves forming a seat 16', adapted to receive one of the spokes 3. Outstanding from one of the ribs 16' is a spindle 17, terminating in a reduced tip 18, defining a shoulder 19 on the spindle 17. A nut 20, or other securing member, is applied to the outer, free end of the tip 18, and between the nut 20 and the shoulder 19 is journaled for rotation a wheel 21, having flanges 22 at its ends. The wheel 21 bears against the periphery of the opening 7, and the flanges 22 extend beyond the opening 7, upon both sides of the shield or body 5. Any number of the clamps shown in Fig. 5 may be provided. Preferably three are used. Obviously the wheels 21 serve to support the body 5; and in order that the wheels 21 may bear properly against the edge of the opening 7, the adjustment of the clamps 12 and 14, upon the spoke 3, must be unlimited. Owing to the fact that the clamping member, shown in Fig. 5, engages but one of the spokes 3, and owing to the peculiar construction of the clamping member, said member may be adjusted freely, from one end of the spoke to the other. Therefore, all of the wheels 21 may be made to bear equally and evenly against the periphery of the opening 7.

Owing to the fact that the spring member 8 is secured to the axle 1, or to some other part of the running gear of the vehicle, instead of being secured to the body of the vehicle, the shield 6 may be connected with the forward axle of the vehicle, it being recalled that this forward axle commonly has movement with respect to the vehicle body.

In Fig. 3, a modified form of the invention is shown. The supporting means hereinbefore described are employed in connection with that form of the invention which appears in Fig. 3. In Fig. 3, the body is denoted by the numeral 23, and is in the form of a dial for a time piece, the dial being suitably inscribed, as shown at 24. Secured to some portion of the vehicle wheel 25, preferably to the hub 26, is a cap 27, which may be held in place by means of a set screw 28, hands 29 being secured as shown at 30, to the end face of the cap 27, the hands 29 being adapted to move over the outer face of the dial 23, when the wheel is rotated. The device shown in Fig. 3 is adapted peculiarly to be used for advertising the wares of jewelers and clock manufacturers.

The shield or body is fashioned from light and inexpensive material of any sort, and the shield may be of any form. The shield may be inscribed with advertising matter, as shown at 30' in Fig. 1. The lower edge of the shield is spaced from the lower portion of the periphery of the wheel, so as to clear the curb, and the hub 4 projecting beyond the outer face of the shield, serves to protect the same.

It will be readily understood, without specific illustration, that the advertising matter 30' may be applied to the inner face of the shield or body, so that the advertising matter upon any one particular shield may be read from both sides of the vehicle.

Having thus described the invention, what is claimed is:—

1. In a device of the class described, a body adapted to be carried upon the outside of a vehicle wheel and having the form of a time piece dial; means for securing the body to a vehicle; a hand adapted to move over the dial; and means for securing the hand to the wheel of the vehicle.

2. In a device of the class described, a body adapted to be carried upon the outside of a vehicle wheel and having the form of a time piece dial and provided with an opening adapted to receive the hub of a vehicle wheel; means for upholding the body from the vehicle; a cap adapted to engage the hub of a vehicle wheel; means for holding the cap upon the hub of a vehicle wheel, for rotation therewith; and a hand carried by the cap, and adapted to register upon the body.

3. In a device of the class described, a body having the form of a time piece dial, and provided with an opening adapted to receive the hub of a vehicle wheel; an arched spring secured at one end to the body and having, at its other end, means to engage the axle of a vehicle, the spring comprising arms of different lengths, whereby the spring may extend across the periphery of a vehicle wheel, thereby to position the body upon one side of the vehicle wheel and to position the axle-engaging means upon the other side of the wheel of the vehicle; an anti-friction element; means for connecting the anti-friction element with the wheel of a vehicle, the anti-friction element being adapted to engage the body at the periphery of the opening therein; a cap; means for securing the cap to the hub of a vehicle wheel; and a hand carried by the cap, and adapted to register upon the dial.

4. The combination with the body, wheel and axle of a vehicle, of a shield located upon the outside of the wheel; a member secured against rotation to the axle on the inside of the wheel; and a connection between the member and the shield, the connection being independent of the body of the vehicle and being extended across the periphery of the wheel independently of the wheel.

In testimony that I claim the foregoing as my own, I have hereto affixed my signature in the presence of two witnesses.

ROBERT KING BLACKSHEAR.

Witnesses:
N. R. MILLER,
P. M. McMILLIAN.

Copies of this patent may be obtained for five cents each, by addressing the "Commissioner of Patents, Washington, D. C."